United States Patent [19]
Arimatsu

[11] Patent Number: 6,135,229
[45] Date of Patent: Oct. 24, 2000

[54] DRIVING FORCE TRANSMITTING APPARATUS FOR FOUR-WHEEL DRIVE VEHICLE

[75] Inventor: Masao Arimatsu, Kanagawa-ken, Japan

[73] Assignee: Nissan Motor Co., Ltd., Yokohama, Japan

[21] Appl. No.: 09/156,669

[22] Filed: Sep. 18, 1998

[30] Foreign Application Priority Data

Sep. 19, 1997 [JP] Japan ................................. P9-254753

[51] Int. Cl.$^7$ ............................................... B60K 17/344
[52] U.S. Cl. ............................................. 180/248; 74/424
[58] Field of Search .................................. 180/247, 248, 180/249, 233; 74/424

[56] References Cited

U.S. PATENT DOCUMENTS

| | | | |
|---|---|---|---|
| 750,424 | 1/1904 | Bard | 180/248 |
| 926,797 | 7/1909 | Williams | 180/248 |
| 1,255,299 | 2/1918 | Ditmars | 180/248 |
| 1,288,022 | 12/1918 | Kellogg | 180/248 |
| 4,651,587 | 3/1987 | Anderson et al. | 74/424 X |
| 4,693,334 | 9/1987 | Hiraiwa | 180/248 X |
| 5,167,293 | 12/1992 | Park et al. | 180/248 |
| 5,193,639 | 3/1993 | Hara et al. | 180/248 |
| 5,323,870 | 6/1994 | Parigger et al. | 180/248 X |
| 5,335,747 | 8/1994 | Müller | 180/249 |
| 5,701,247 | 12/1997 | Sasaki | 180/248 X |

FOREIGN PATENT DOCUMENTS 63-162334  7/1988  Japan .

*Primary Examiner*—Charles A. Marmor
*Assistant Examiner*—Ha Ho
*Attorney, Agent, or Firm*—Foley & Lardner

[57] ABSTRACT

A transfer 44 is connected, through a main transmission 42, to an engine 40 disposed in a front side of a vehicle, and a propeller shaft 52 is connected between the transfer 44 and a rear differential device 54 in a longitudinal direction of the vehicle. An input gear 52*a* formed on one end of the propeller shaft is meshed with a rear wheel output gear 44*a* at the side of the transfer which transmits a driving torque of the engine to the side of the rear wheels. An output gear 52*b* formed on the other end of the propeller shaft is meshed with a rear differential gear 54*a* of the rear differential device. The number of teeth of the input gear 52*a* of the propeller shaft and the number of teeth of the output gear 52*b* of the propeller shaft are set different from each other.

8 Claims, 4 Drawing Sheets

FIG. 5

| THE NUMBER OF TEETH OF INPUT GEAR 52a | THE NUMBER OF TEETH OF TRANSFERRING GEAR 44a | FIRST GEAR RATIO | THE NUMBER OF TEETH OF OUTPUT GEAR 52b | THE NUMBER OF TEETH OF REAR DIFFERENTIAL GEAR 54a | SECOND GEAR RATIO | GEAR RATIO DIFFERENCE |
|---|---|---|---|---|---|---|
| 20 | 41 | 2.0500 | 19 | 39 | 2.0526 | 0.0026 |
| 19 | 39 | 2.0526 | 18 | 37 | 2.0556 | 0.0029 |
| 18 | 37 | 2.0556 | 17 | 35 | 2.0588 | 0.0033 |
| 17 | 35 | 2.0588 | 16 | 33 | 2.0625 | 0.0037 |
| 16 | 33 | 2.0625 | 15 | 31 | 2.0667 | 0.0042 |
| 15 | 31 | 2.0667 | 14 | 29 | 2.0714 | 0.0048 |
| 14 | 29 | 2.0714 | 13 | 27 | 2.0769 | 0.0055 |
| 13 | 27 | 2.0769 | 12 | 25 | 2.0833 | 0.0064 |
| 8 | 21 | 2.6250 | 19 | 50 | 2.6316 | 0.0066 |
| 11 | 32 | 2.9091 | 12 | 35 | 2.9167 | 0.0076 |
| 12 | 35 | 2.9167 | 13 | 38 | 2.9231 | 0.0064 |
| 13 | 38 | 2.9231 | 14 | 41 | 2.9286 | 0.0055 |
| 14 | 41 | 2.9286 | 15 | 44 | 2.9333 | 0.0048 |
| 15 | 44 | 2.9333 | 16 | 47 | 2.9375 | 0.0042 |
| 16 | 47 | 2.9375 | 17 | 50 | 2.9412 | 0.0037 |
| 16 | 49 | 3.0625 | 15 | 46 | 3.0667 | 0.0042 |
| 15 | 46 | 3.0667 | 14 | 43 | 3.0714 | 0.0048 |
| 14 | 43 | 3.0714 | 13 | 40 | 3.0769 | 0.0055 |
| 11 | 38 | 3.4545 | 13 | 45 | 3.4615 | 0.0070 |
| 11 | 43 | 3.9091 | 12 | 47 | 3.9167 | 0.0076 |
| 17 | 42 | 2.4706 | 15 | 37 | 2.4667 | 0.0039 |

DRIVING FORCE TRANSMITTING APPARATUS FOR FOUR-WHEEL DRIVE VEHICLE

BACKGROUND OF THE INVENTION

1. Field of the Invention

The present invention relates to a driving force transmitting apparatus for a four-wheel drive vehicle based on a front engine and front drive system.

2. Description of Related Art

As a driving force transmitting apparatus for a four-wheel drive vehicle, there is a known technique described in Japanese Patent Application Laid-open No. 63-162334 for example. This technique (which will be referred to as conventional art 1, hereinafter) is applied to a four-wheel drive vehicle based on an FF (front engine and front drive) system in which the engine is disposed horizontally as shown in FIG. 1. Reference number 2 denotes an engine, symbols Tfl and Tfr denotes left and right front wheels, respectively, symbols Trl and Trr denote left and right rear wheels, respectively, and reference number 4 denotes a driving force transmitting system for varying a driving force distributing ratio to each of the wheels Tfl, Tfr, Trl and Trr.

The driving force transmitting system 4 includes an automatic transmission 6 for gear shifting a driving force from the engine 2 at a predetermined gear shift ratio, and a transfer 8 for dividing the driving force from this automatic transmission 6 to the front wheels Tfl and Tfr as a front wheel driving torque, and to the rear wheels Trl and Trr as a rear wheel driving torque. The front wheel driving torque is transmitted to the front wheels Tfl and Tfr as a driving force through a front wheel drive shaft 10, and the rear driving torque is transmitted to the rear wheels Trl and Trr as a driving force through a propeller shaft 12 and a rear differential device 32. The transfer 8 includes a center differential device 16 to which the driving torque is transmitted from an output gear 6a of the automatic transmission 6, a front differential device 18 connected to the center differential device 16 for transmitting the front wheel driving force to the front wheels Tfl and Tfr, a differential control clutch 20, a control device 22 and various input systems 24.

The control device 22 sends a pulse signal of a predetermined duty ratio in accordance with information sent from the various input systems 24, thereby operating the differential clutch 20. When a grip force of magnitude in accordance with the duty ratio is generated between a differential case 16a and a rear wheel output side gear 16b, a differential generated between a front wheel output side gear 16c and a rear wheel output side gear 16b is suppressed in accordance with the grip force, so that a torque is transmitted from the wheels rotating faster to the wheels rotating slower.

Reference number 30 denotes a transferring gear which is to be connected to the rear output side gear 16b, and reference number 32a denotes a rear differential gear of a rear differential device 32. An input gear 12a formed at a front end of the propeller shaft 12 meshes with the transferring gear 30, and an output gear 12b formed at a rear end of the propeller shaft 12 meshes with the rear differential gear 32a. The number of teeth of the output gear 12b is 12, and the number of teeth of the rear differential gear 32a is 41. With these number of teeth, the front wheel output side gear 16c which is at the side of the front wheels of the center differential device 16 always rotates 2.4% faster than the rear wheel output side gear 16b which is at the side of the rear wheels.

With this arrangement, since relative rotation (differential) between the front wheel side and the rear wheel side of the center differential device 16 is generated when the vehicle is running, it is possible to limit the torque amount transmitted from the wheels rotating faster to the wheels rotating slower depending upon a degree of grip force for suppressing this differential by the differential control clutch 20. More specifically, when the differential generated between the front and rear wheels is suppressed with a weak force, only a torque in an amount corresponding to this weak force can be transmitted from the wheels rotating faster to the wheels rotating slower. On the contrary, when the differential is suppressed with a strong force, a large amount of torque can be transmitted from the wheels rotating faster to the wheels rotating slower. Therefore, a torque distribution ratio between the front and rear wheels can arbitrarily be set.

Further, as a four-wheel drive vehicle of FF system in which electric control means or hydraulic control means is not used, there is a known apparatus comprising a propeller shaft for transmitting a driving force from a transfer disposed at the side of front wheel to a rear differential device disposed at the side of rear wheels, and viscous couplings as a limit slip differential connected to the propeller shaft in series (this known technique is referred to as conventional art 2, hereinafter).

In the conventional art 1 shown in FIG. 1, the input gear 12a of the propeller shaft 12 meshed with the transferring gear 30 and the input gear 12b of the propeller shaft meshed with the rear differential gear 32a have the same number of teeth (12). Therefore, if the propeller shaft 12 rotates, since the input gear 12a and the output gear 12b are meshed with each other in the same teeth meshing state, gear noise increases in many cases.

In the conventional art 2 in which the viscous couplings are connected to the propeller shaft in series, a first gear meshed with a gear at the side of the transfer of the propeller shaft and a second gear meshed with a gear at the side of the rear differential device also have the same number of teeth. Therefore, if the viscous couplings are operated to such a degree that an inner plate and an outer plate are relatively rotated, a difference in the number of rotation between the first and second gears is slightly varied, a noise of the first gear and a noise of the second gear are superposed such as a surge phenomenon, and beat sound may be generated in many cases.

Further, in the conventional art 1, a gear ratio between the transferring gear 30 (the number of teeth: 42) at the side of the transfer 8 and the input gear 12a (the number of teeth: 12) is set to 3.500 (42/12), a gear ratio between the rear differential gear 32a (the number of teeth: 41) at the side of the rear differential device 32 and the output gear 12b (the number of teeth: 12) is set to 3.417 (41/12), and a difference between the gear ratios at the side of the transfer 8 and at the side of the rear differential device 32 is set large (3.500−3.417=0.083). If the gear ratio difference is set large, parts in the center differential device 16 are rotated always in slipping state when the vehicle is running, and the temperature of the lubricant oil charged in the apparatus is prone to rise, which exerts an influence on the durability of the center differential device 16.

SUMMARY OF THE INVENTION

The present invention has been accomplished in view of the above circumstances, and a first object is to lower the gear noise at the driving force transmitting gear portion, and a second object is to provide a driving force transmitting apparatus for a four-wheel drive vehicle which suppresses the rise in temperature of lubricant oil and which does not exert an influence on the durability of the operating apparatus To achieve the above object, according to a first aspect of the present invention, there is provided a driving force transmitting apparatus for a four-wheel drive vehicle comprising: a transfer connected, through a main transmission, to an engine disposed in a front side of a vehicle, and including a rear wheel output gear for transmitting a driving torque of the engine to the side of rear wheels; a propeller shaft connected to the transfer and extended in a longitudinal direction of the vehicle, and provided at its front end with an input gear meshed with the rear wheel output gear; and a rear differential device connected to the propeller shaft, and meshed with an output gear formed on a rear end of the propeller shaft; wherein the number of teeth of the input gear of the propeller shaft and the number of teeth of the output gear of the propeller shaft are set different from each other.

With the first aspect of the invention, since the number of teeth of each of the input gear and output gear of the propeller shaft is set different from each other, when the propeller shaft rotates, the input gear and the output gear are not brought into the same teeth meshing state, gear noise should not be increased.

According to a second aspect of the present invention, there is provided a driving force transmitting apparatus for a four-wheel drive vehicle comprising: a transfer connected, through a main transmission, to an engine disposed in a front side of a vehicle, and including a rear wheel output gear for transmitting a driving torque of the engine to the side of rear wheels; a propeller shaft connected to the transfer and extended in a longitudinal direction of the vehicle, and provided at its front end with an input gear meshed with the rear wheel output gear; a limited slip differential connected, in series, to the propeller shaft for limiting a differential between front and rear wheels; and a rear differential device connected to the propeller shaft, and meshed with an output gear formed on a rear end of the propeller shaft; wherein the number of teeth of the input gear of the propeller shaft and the number of teeth of the output gear of the propeller shaft are set different from each other.

With the second aspect of the invention, since the number of teeth of each of the input gear and output gear of the propeller shaft is set different from each other, even if the limited slip differential connected to the propeller shaft in series is slightly operated, meshing degrees at the side of the input and at the side of the output gear are largely different and therefore, a noise at the side of the first gear and a noise at the side of the second gear should not be superposed such as a surge phenomenon, and beat sound can be prevented from being generated.

In a preferred embodiment, when a gear ratio between the rear wheel output gear and the input gear is expressed as a first gear ratio, and a gear ratio between the rear differential gear and the output gear is expressed as a second gear ratio, a gear ratio difference between the first and second gear ratios is set to be 0.01 or less.

With this embodiment, a difference between the first gear ratio (gear ratio of the rear wheel output gear and the input gear) and the second gear ratio (gear ratio of the rear differential gear and the output gear) is set as small as 0.01 or less and therefore, parts in the operating apparatus (the center differential device, the front differential device) are not rotated in slipping state almost at all, and the temperature of the lubricant oil is suppressed from being increased and thus, no influence is exerted on the durability of the apparatus.

Further, even if the driving torque is intermittently transmitted to the propeller shaft due to a variation in road surface condition or a difference in kinematics radius between the front and rear wheels, since small gear ratio difference is set in the present invention, teeth surfaces of the rear output and input gears are abutted against each other, and teeth surfaces of the output gear and the rear differential gear are also abutted against each other and therefore, floating noise by striking the tooth of the gears such as quack noise can be prevented from being generated.

In another embodiment, the number of teeth of the input gear is set in a range of 8 to 20, the number of teeth of the input gear and rear wheel gear are set to be relatively primes, and the number of teeth of the output gear is set in a range of 8 to 20, and the number of teeth of the output gear and the rear differential gear are set to be relatively primes.

With this embodiment, since the number of teeth of each of the input and output gears is set in a range of 8 to 20, the rear wheel output gear and the rear differential gear can be meshed accurately, and it is possible to provide a gear in which a thickness of the tooth is set to an appropriate value so that the durability is enhanced. Further, since the number of teeth of the input gear and the rear wheel output gear are set to be relatively primes, and the number of teeth of the output gear and the rear differential gear are set to be relatively primes. Therefore, the number of times when the same tooth strikes the same tooth is reduced and the durability of the tooth surface is enhanced.

The above and other objects, features and advantages of the invention will become apparent from the following description of a preferred embodiment taken in conjunction with the accompanying drawings.

BRIEF DESCRIPTION OF THE DRAWINGS

FIG. 5 is a table showing combinations of the number of teeth of a rear output gear and other gears such as a rear differential gear.

DETAILED DESCRIPTION OF THE PREFERRED EMBODIMENTS

Embodiments of the present invention will be explained next with reference to the accompanying drawings.

Figure 1:
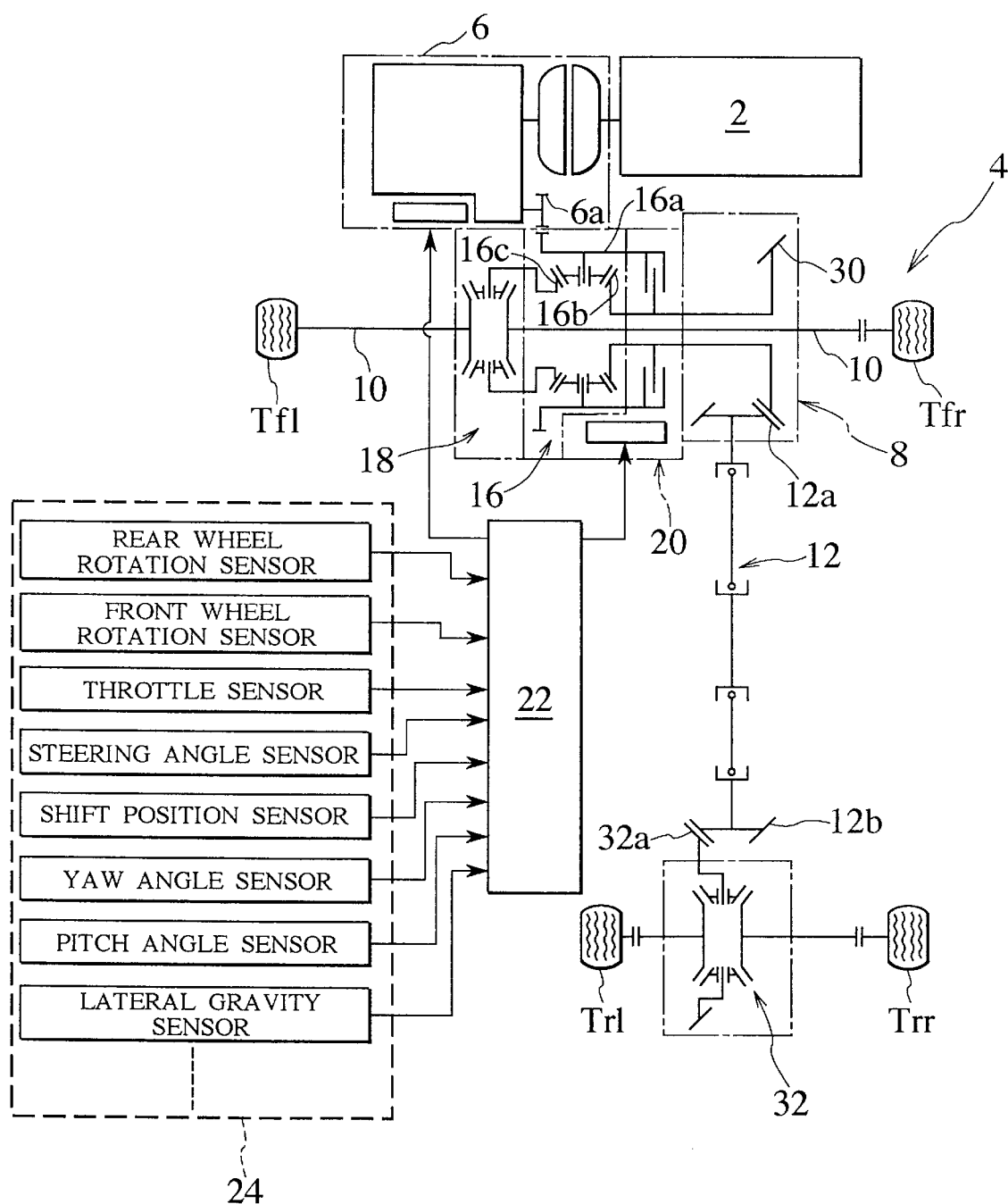
FIG. 1 is a schematic diagram of a structure showing a conventional driving force transmitting apparatus for a four-wheel drive vehicle.
Figure 2:
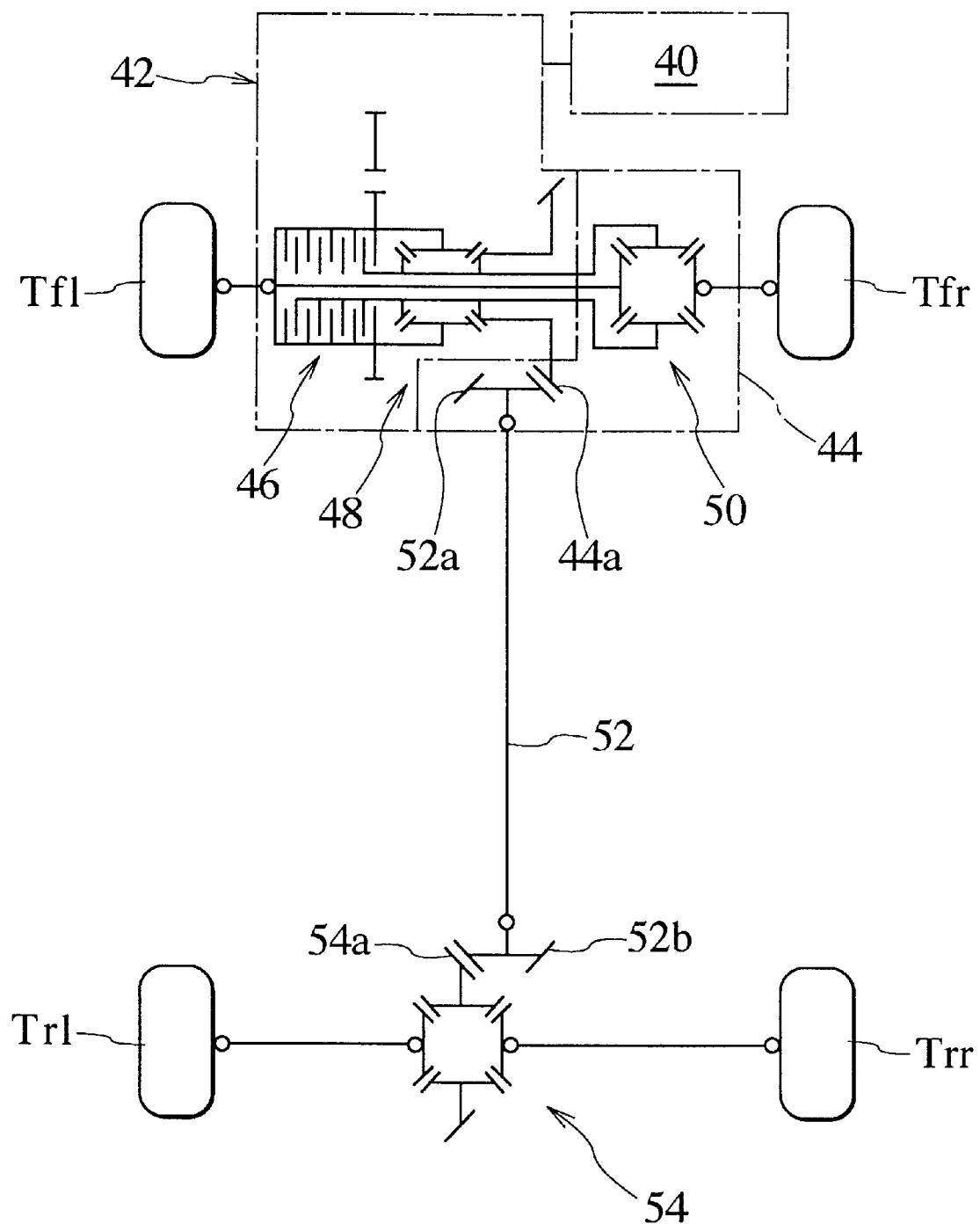
FIG. 2 is a schematic diagram of a structure showing a first embodiment of a driving force transmitting apparatus for a full time four-wheel drive vehicle.

FIG. 2 shows a driving force transmitting apparatus for a full time four-wheel drive vehicle based on an FF (front engine and front drive) vehicle having a horizontally disposed engine.

In this apparatus, a transmission 42 in which a center differential device 48 having viscous couplings 46 is incorporated is directly connected to a horizontally disposed engine 40, and a front differential device 50 is incorporated in a transfer 44 assembled to this transmission 42.

An input gear 52a of a propeller shaft 52 is meshed with a transferring gear (rear wheel output gear) 44a of the transfer 44, and a rear differential gear 54a of a rear differential device 54 is meshed with an output gear 52b of the propeller shaft 52. When a difference in the number of rotation is generated between front wheels and rear wheels during running of the vehicle, if the difference is small, a differential operation is carried out by the center differential device 48, and if the difference is large, the viscous couplings 46 are operated to limit the differential to distribute an appropriate torque to the front and rear wheels. If such a large difference in the number of rotation that either one of the front and rear wheels are idle is generated, an inner plate and an outer plate of the viscous couplings 46 are contacted with each under pressure so that the viscous couplings 46 are directly connected to the front wheels and therefore, the driving torque is equally transmitted to the front and rear wheels.

In the present embodiment, the number of teeth of the transferring gear 44a is 37, the number of teeth of the input gear 52a is 11, the number of teeth of the output gear 52b is 14 and the number of teeth of the rear differential gear 54a is 47. A gear ratio (first gear ratio) at the side of the transfer 44 of the propeller shaft 52 is set to be 3.364 (37/11), a gear ratio (second gear ratio) at the side of the rear differential device 54 is set to be 3.357 (47/14), and a difference between the gear ratios is set to be a small value (3.357–3.364= 0.007).

According to the above structure, the number of teeth of each of the input gear 52a and the output gear 52b of the propeller shaft 52 are set different from each other. Therefore, when the propeller shaft 52 rotates, the same teeth of the input gear 52a and the output gear 52 do not abut against each other and thus, there is no possibility that the gear noise is increased.

Further, since the number of teeth of the transferring gear 44a and the input gear 52a are set to be relatively primes (37, 11), and the number of teeth of the output gear 52b and the rear differential gear 54a are set to be relatively primes (47, 14), so that the number of times when the same tooth strikes the same tooth is reduced and therefore, the durability of the tooth surface is enhanced.

Figure 4:
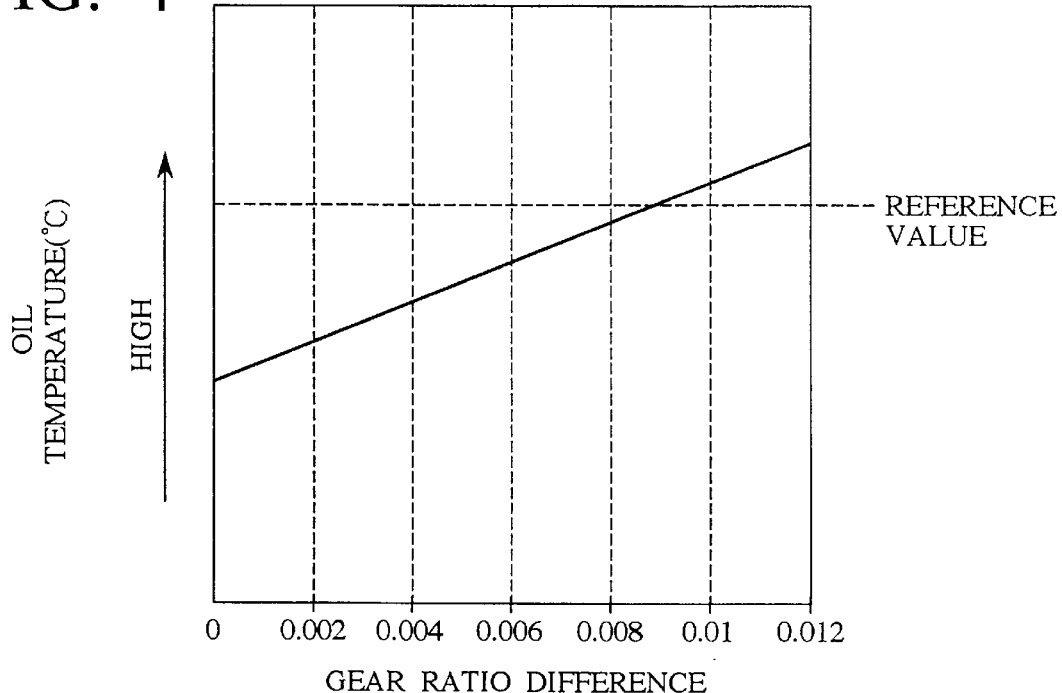
FIG. 4 is a graph showing a variation in temperature of lubricant oil in a differential device when a gear ratio is varied.

FIG. 4 shows a variation in temperature of lubricant oil in the center differential device 48 when the gear ratio is varied. As can be seen in FIG. 4, when the gear ratio exceeds 0.01, the temperature of lubricant oil exceeds a reference value by slipping of parts in the center differential device 48. Whereas, if a difference between the first gear ratio and the second gear ratio is small (0.007) as in the present embodiment, the parts in the center differential device 48 are not rotated in slipping state almost at all, and the temperature of the lubricant oil charged in the apparatus does not rise. Therefore, bad influence is not exerted on the durability of the center differential device 48.

Further, even if the driving torque is intermittently transmitted to the propeller shaft 52 due to a variation in road surface condition or a difference in kinematic radius between the front and rear wheels, since small gear ratio difference is set in the present embodiment, teeth surfaces of the transferring gear 44a and the input gear 52a are abutted against each other, and teeth surfaces of the output gear 52b and the rear differential gear 54a are also abutted against each other and therefore, floating noise by striking the tooth of the gears such as quack noise can be prevented from being generated. Furthermore, since the number of teeth of each of the output gear 52b and the rear differential gear 54a at the side of the rear differential device 54 is greater than that of the gear at the side of the transfer 44, the floating noise can be effectively prevented from being generated, and a nose entering to the passenger room of the vehicle can be lowered.

Figure 3:
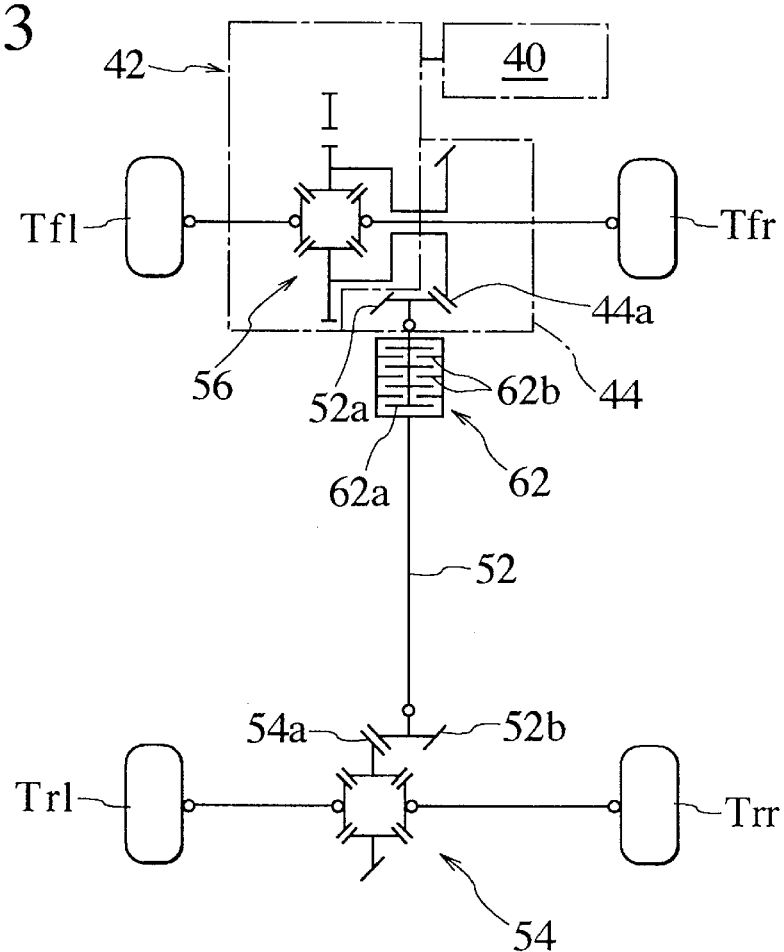
FIG. 3 is a schematic diagram of a structure showing a second embodiment of a driving force transmitting apparatus for a full time four-wheel drive vehicle.

Next, FIG. 3 shows a second embodiment in which a front differential device 56 is incorporated in the transmission 42, and the transfer 44 is connected to the front differential device 56. A driving torque transmitted from an engine 40 through the transmission 42 is transmitted to a front differential device 56 to drive the front wheels Tfl and Tfr. The driving torque transmitted to the front differential device 56 is also transmitted to the transferring gear 44a of the transfer 44, and is transmitted to the propeller shaft 52 through an input gear 52a which is meshed with the transferring gear 44a. The driving torque is further transmitted from the propeller shaft 52 to the rear differential device 54 through the output gear 52b and the rear differential gear 54a which are meshed with each other, thereby driving the rear wheels Trl and Trr. Viscous couplings 62 are connected to the propeller shaft 52 in series, and an inner plate 62a is connected at the side of the transfer 44, and an outer plate 62b of the viscous couplings 62 is connected at the side of the rear differential device 54.

If there is no difference in rotational speed between the front and rear wheels when the vehicle is normally running, all the driving torque is transmitted to the front wheels Tfl and Tfr and the vehicle runs as the FF vehicle. If the front wheels Tfl and Tfr generate slipping at the time of starting or acceleration, the viscous couplings 62 limit the differential to distribute the driving force to the rear wheels Trl and Trr. The driving torque is distributed to the rear wheels also when a difference in rotational speed is generated due to a road surface condition during running.

In the present embodiment, the number of teeth of the transferring gear 44a is 37, the number of teeth of the input gear 52a is 10, the number of teeth of the output gear 52b is 13 and the number of teeth of the rear differential gear 54a is 48. A gear ratio (first gear ratio) at the side of the transfer 44 of the propeller shaft 52 is set to be 3.700 (37/10), a gear ratio (second gear ratio) at the side of the rear differential device 54 is set to be 3.692 (48/13), and a difference between the gear ratios is set to be a small value (3.700–3.692= 0.008).

According to the above structure, the number of teeth of each of the input gear 52a and the output gear 52b of the propeller shaft 52 are set different from each other. Therefore, when the propeller shaft 52 rotates, the same teeth of the input gear 52a and the output gear 52b do not abut against each other and thus, there is no possibility that the gear noise is increased.

Further, since the number of teeth of each of the input gear 52a and output gear 52b of the propeller shaft 52 are set different from each other, when the viscous couplings 62 are operated in such a degree that the inner plate 62a and the outer plate 62b are relatively rotated, meshing degrees at the side of the input gear 52a and at the side of the output gear 52b are largely different and therefore, a noise at the side of the input gear 52a and a noise at the side of the output gear 52b should not be superposed such as a surge phenomenon, and beat sound can be prevented from being generated.

Furthermore, since the number of teeth of the transferring gear 44a and the input gear 52a are set to be relatively primes (37, 10), and the number of teeth of the output gear 52b and the rear differential gear 54a are set to be relatively primes (48, 13), so that the number of times when the same tooth strikes the same tooth is reduced and therefore, the durability of the tooth surface is enhanced.

A difference in the gear ratios of the present embodiment is also set to be a small value (0.008) and therefore, parts in the front differential device 56 are not rotated in slipping state almost at all, and the temperature of the lubricant oil charged in the apparatus does not rise and thus, bad influence should not be exerted on the durability of the front differential device 56.

Further, even if the driving torque is intermittently transmitted to the propeller shaft 52 due to a variation in road surface condition or a difference in kinematic radius between the front and rear wheels, since small gear ratio difference is set in the present embodiment, floating noise by striking the tooth of the gears such as quack noise can be prevented from being generated.

FIG. 5 shows another embodiment of the number of teeth of each of the input gear 52*a*, the transferring gear 44*a*, the output gear 52*b* and the rear differential gear 54*a* when the first and second gear ratios are set to be 2 to 4, and the gear ratio difference is set to be 0.01 or less.

In this embodiment, the number of teeth of each of the input gear 52*a* and the output gear 52*b* is set in a range of 8 to 20. If the number of teeth of the input gear 52*a* and the output gear 52*b* is less than 8, it is difficult to make the transferring gear 44*a* and the output gear 52*b* normally mesh with each other. If the number of teeth of the input gear 52*a* and the output gear 52*b* exceeds 20, the thickness of the tooth becomes thin and thus, the durability of each of the input gear 52*a* and the output gear 52*b* is deteriorated. Therefore, the number of teeth of each the input gear 52*a* and the output gear 52*b* was set in a range of 8 to 20.

Further, the number of teeth of the transferring gear 44*a* and the input gear 52*a* are set to be relatively primes, and the number of teeth of the output gear 52*b* and the rear differential gear 54*a* are set to be relatively primes. Therefore, the number of times when the same tooth strikes the same tooth is reduced and the durability of the tooth surface is enhanced.

Combinations of the number of teeth should not be limited to FIG. 5, and other combination may be used if the number of each the input gear 52*a* and the output gear 52*b* is set in a range of 8 to 20, the gear ratio difference is 0.01 or less, the number of teeth of the transferring gear 44*a* and the input gear 52*a* are set to be relatively primes, and the number of teeth of the output gear 52*b* and the rear differential gear 54*a* are set to be relatively primes.

In the second embodiment shown in FIG. 3, the viscous couplings 62 are disposed on the propeller shaft 52 as a limited slip differential. Instead of the viscous couplings 62, if a limited slip differential such as an axial plunger pump coupling (AXC: Fujiunivance Co.) which transmits a driving torque utilizing viscosity resistance of the hydraulic fluid passing through an orifice is disposed in front of the rear differential device or is incorporated in the rear differential device, the same effect can be obtained.

What is claimed is:

1. A driving force transmitting apparatus for a four-wheel drive vehicle comprising:

a transfer connected, through a main transmission, to an engine disposed in a front side of a vehicle, and including a rear wheel output gear for transmitting a driving torque of said engine to a side of rear wheels;

a propeller shaft connected to said transfer and extended in a longitudinal direction of said vehicle, said propeller shaft including an input gear provided on a front end thereof and engaged with said rear wheel output gear to constitute a set of gears, said propeller shaft further including an output gear provided on a rear end thereof; and a rear differential device connected to said propeller shaft, and having a rear differential gear meshed with said output gear of said propeller shaft;

wherein the number of teeth of said input gear of said propeller shaft and the number of teeth of said output gear of said propeller shaft are set different from each other.

2. A driving force transmitting apparatus for a four-wheel drive vehicle according to claim 1, wherein when a gear ratio between said rear wheel output gear and said input gear is expressed as a first gear ratio, and a gear ratio between said rear differential gear and said output gear is expressed as a second gear ratio, a gear ratio difference between said first and second gear ratios is set to be 0.01 or less.

3. A driving force transmitting apparatus for a four-wheel drive vehicle according to claim 1, wherein the number of teeth of said input gear is set in a range of 8 to 20, the number of teeth of said input gear and the number of teeth of said rear wheel output gear are set to be relatively prime, the number of teeth of said output gear is set in a range of 8 to 20, and the number of teeth of said output gear and the number of teeth of said rear differential gear are set to be relatively prime.

4. A driving force transmitting apparatus for a four-wheel drive vehicle according to claim 1, wherein said rear wheel output gear meshes with an output gear of said main transmission so that a gear set is provided to produce a single speed reduction from said output gear of said main transmission to said rear wheel output gear.

5. A driving force transmitting apparatus for a four-wheel drive vehicle comprising:

a transfer connected, through a main transmission, to an engine disposed in a front side of a vehicle, and including a rear wheel output gear for transmitting a driving torque of said engine to a side of rear wheels;

a propeller shaft connected to said transfer and extended in a longitudinal direction of said vehicle, said propeller shaft including an input gear provided on a front end thereof and engaged with said rear wheel output gear to constitute a set of gears, said propeller shaft further including an output gear provided on a rear end thereof;

a limited slip differential connected, in series, to said propeller shaft for limiting a differential between front and rear wheels; and a rear differential device connected to said propeller shaft, and meshed with said output gear of said propeller shaft;

wherein the number of teeth of said input gear of said propeller shaft and the number of teeth of said output gear of said propeller shaft are set different from each other.

6. A driving force transmitting apparatus for a four-wheel drive vehicle according to claim 5, wherein when a gear ratio between said rear wheel output gear and said input gear is expressed as a first gear ratio, and a gear ratio between said rear differential gear and said output gear is expressed as a second gear ratio, a gear ratio difference between said first and second gear ratios is set to be 0.01 or less.

7. A driving force transmitting apparatus for a four-wheel drive vehicle according to claim 5, wherein the number of teeth of said input gear is set in a range of 8 to 20, the number of teeth of said input gear and the number of teeth of said rear wheel gear are set to be relatively prime, the number of teeth of said output gear is set in a range of 8 to 20, and the number of teeth of said output gear and the number of teeth of said rear differential gear are set to be relatively prime.

8. A driving force transmitting apparatus for a four-wheel drive vehicle according to claim 5, wherein said rear wheel output gear meshes with an output gear of said main transmission so that a gear set is provided to produce a single speed reduction from said output gear of said main transmission to said rear wheel output gear.

* * * * *